Aug. 11, 1959     D. DI DOMENICO     2,898,967
TIRE TRACTION CHAIN SECURING DEVICE
Filed July 25, 1957
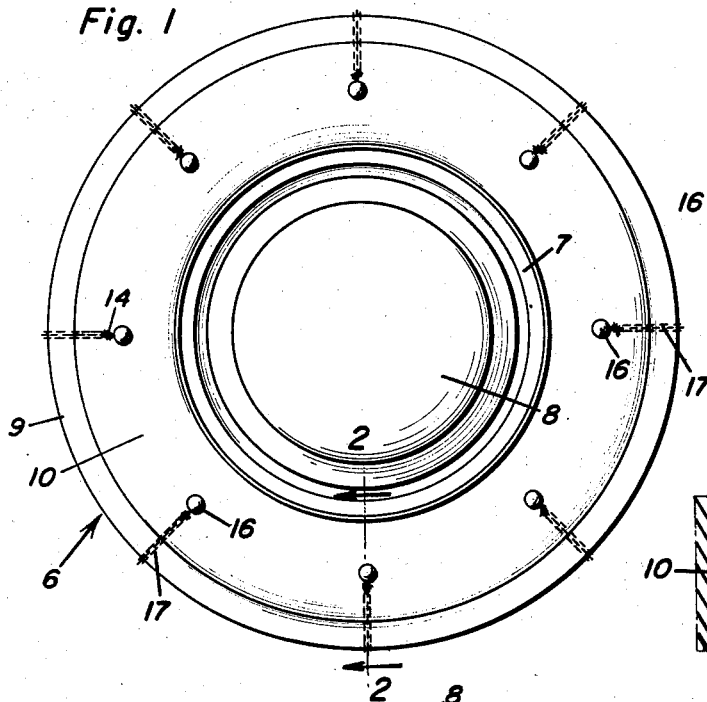
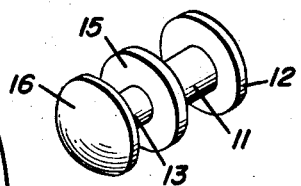
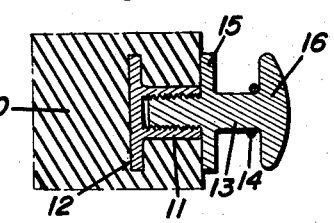
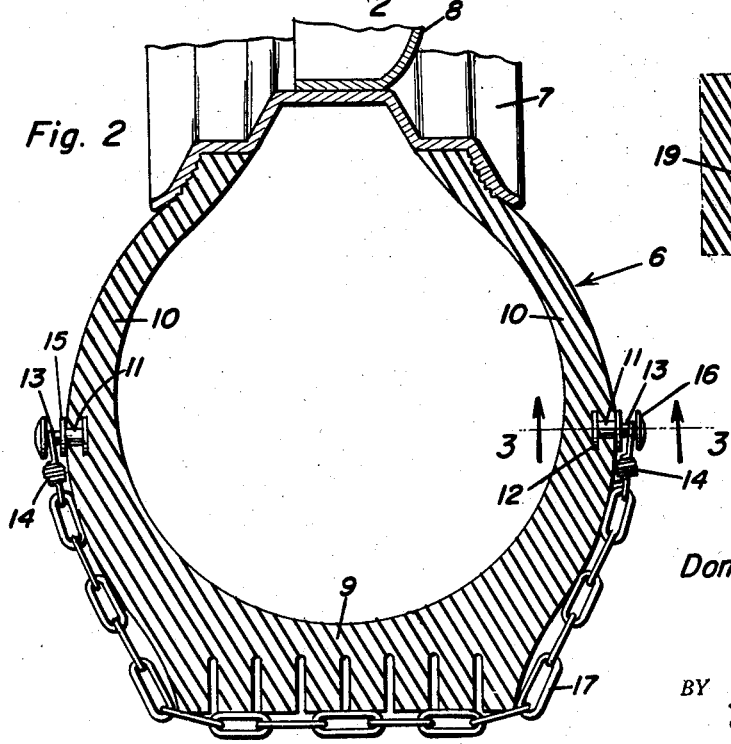
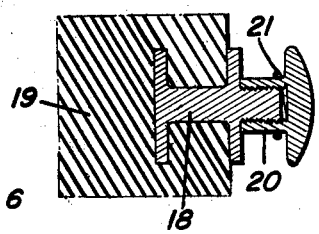
Domenic DiDomenico
INVENTOR.

United States Patent Office 2,898,967
Patented Aug. 11, 1959

2,898,967

TIRE TRACTION CHAIN SECURING DEVICE

Domenic Di Domenico, East Boston, Mass.

Application July 25, 1957, Serial No. 674,119

1 Claim. (Cl. 152—233)

The present invention relates to new and useful improvements in snow or traction chains particularly for pneumatic vehicle tires and has for its primary object to provide, in a manner as hereinafter set forth, a chain of this character comprising novel means whereby said chain may be expeditiously and firmly secured in position for use on the tire or removed therefrom.

Other objects of the invention are to provide a snow or traction chain of the aforementioned character which will be comparatively simple in construction, strong, durable, highly efficient and reliable in use and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in side elevation, showing a tire equipped with a plurality of chains embodying the present invention;

Figure 2 is an enlarged view in transverse section, taken substantially on the line 2—2 of Figure 1;

Figure 3 is an enlarged view in horizontal section, taken substantially on the line 3—3 of Figure 2;

Figure 4 is a detail view in perspective of the chain anchoring means; and

Figure 5 is a sectional view substantially similar to Figure 3 but showing a modification.

Referring now to the drawing in detail, it will be seen that reference character 6 designates generally a tubeless pneumatic vehicle tire mounted on the usual drop center rim 7 of a conventional vehicle wheel 8. The tire 6 includes the usual tread 9 and side walls 10.

Molded or embedded in the side walls 10 of the tire 6 and flush with the outer faces of said side walls is a plurality of circumferentially spaced internally threaded sockets 11 of suitable metal. The closed inner ends of the sockets 11 include anchoring flanges 12. This is shown to advantage in Figure 3 of the drawing. The sockets 11 threadedly receive removable double headed bolts 13, also of suitable metal.

Coil springs 14 have one end pivotally connected to the bolts 13 between the inner and outer heads 15 and 16, respectively, thereof. The springs 14 yieldingly connect the ends of a traction chain 17 to the bolts 13. As shown, the chain 17 traverses the tread 9 of the tire 6.

It is thought that the use of the invention will be readily apparent from a consideration of the foregoing. Briefly, to mount the chains 17 on the tire 6, the bolts 13 are screwed into the sockets 11 in an obvious manner, said bolts turning in the outer ends of the springs 14. Thus, the chains 17 are secured directly to the tire 6. Of course, to remove the chains 17 when desired, the foregoing procedure is reversed.

In the modification of Figure 5 of the drawing, reference character 18 designates a double headed bolt embedded in the tire 19. A headed socket 20 is threaded on the bolt 18, to which socket one end of a coil spring 21 is pivotally connected. Of course, to detach the chain (not shown) in this embodiment of the invention, the socket 20 is removed from the bolt 18.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A tire traction device comprising: transversely aligned, internally threaded sockets embedded in the side walls of the tire flush with the outer faces of said side walls and having heads thereon embedded in said side walls between the inner and outer faces of said side walls, double headed bolts threadedly mounted in the sockets with one head of each bolt flush with the outer face of the respective side wall, and a chain having its ends connected to said bolts between the heads thereof.

References Cited in the file of this patent

UNITED STATES PATENTS

| | | |
|---|---|---|
| 1,014,357 | Adam | Jan. 9, 1912 |
| 2,078,764 | Kielmansegg | Apr. 27, 1937 |